(12) United States Patent
Mazzitelli et al.

(10) Patent No.: US 11,368,408 B2
(45) Date of Patent: Jun. 21, 2022

(54) DYNAMIC VISUALIZATION OF REQUESTS TRAVELING THROUGH A MICROSERVICE MESH

(71) Applicant: RED HAT, INC., Raleigh, NC (US)

(72) Inventors: John Joseph Mazzitelli, Sickerville, NJ (US); Jay Shaughnessy, Cherry Hill, NJ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/005,185

(22) Filed: Aug. 27, 2020

(65) Prior Publication Data
US 2022/0070112 A1    Mar. 3, 2022

(51) Int. Cl.
| | | |
|---|---|---|
| H04L 12/911 | (2013.01) |
| H04L 12/751 | (2013.01) |
| H04L 12/24 | (2006.01) |
| H04L 47/74 | (2022.01) |
| H04L 45/02 | (2022.01) |
| H04L 41/22 | (2022.01) |
| H04L 47/783 | (2022.01) |

(52) U.S. Cl.
CPC ............ *H04L 47/748* (2013.01); *H04L 41/22* (2013.01); *H04L 45/02* (2013.01); *H04L 47/783* (2013.01)

(58) Field of Classification Search
CPC ....... H04L 47/748; H04L 41/22; H04L 45/02; H04L 47/783; G06F 16/9024; G06T 11/206; G06T 15/005
See application file for complete search history.

(56) References Cited

U.S. PATENT DOCUMENTS

| | | | | |
|---|---|---|---|---|
| 8,136,045 | B2 * | 3/2012 | Miura .................. | G06F 3/0482 715/764 |
| 8,471,858 | B2 * | 6/2013 | Ritts ...................... | G06F 11/32 345/502 |
| 8,669,982 | B2 | 3/2014 | Breeds et al. | |
| 9,716,632 | B2 | 7/2017 | Novak et al. | |
| 10,614,071 | B1 | 4/2020 | Chen | |
| 10,680,918 | B1 | 6/2020 | Mazzitelli et al. | |

(Continued)

OTHER PUBLICATIONS

Shang-Pin Ma et al., "Using Service Dependency Graph to Analyze and Test Microservices", Dept. of Comput. Sci. & Eng., Nat. Taiwan Ocean Univ., Keelung, Taiwan; Dept. of Software Eng. & Manage., Nat. Kaohsiung Normal Univ., Kaohsiung, Taiwan; Dept. of Comput. Sci. & Inf. Eng., Feng Chia Univ., Taichung, Taiwan, https://ieeexplore.IEEE.org/document/8377834, Jul. 23-27, 2018, pp. 81-86.

(Continued)

*Primary Examiner* — Chandrahas B Patel
(74) *Attorney, Agent, or Firm* — Lowenstein Sandler LLP

(57) ABSTRACT

A method includes, in response to receiving a request for a graphical visualization of a microservice mesh comprising one or more nodes, obtaining information associated with services operating at the one or more nodes and connections between the one or more nodes. The method further includes determining, in view of the information, one or more types of requests associated with each of the services. The method further includes generating the graphical visualization of the microservice mesh. The graphical visualization includes a first vertex corresponding to a particular service and a second vertex corresponding to a type of a request received by the service. The first vertex and second vertex are connected by an edge that corresponds to the request.

20 Claims, 10 Drawing Sheets

(56) References Cited

U.S. PATENT DOCUMENTS

| | | | |
|---|---|---|---|
| 10,810,257 B2 * | 10/2020 | Van Rest | G06F 16/9024 |
| 10,904,070 B2 * | 1/2021 | Lo | H04L 41/22 |
| 10,909,258 B2 * | 2/2021 | Woodward | H04L 63/105 |
| 10,929,785 B2 * | 2/2021 | Bernstein | G06Q 10/06 |
| 11,100,138 B2 * | 8/2021 | Carlsson | G06F 16/955 |
| 2016/0127978 A1 | 5/2016 | Jing et al. | |
| 2016/0182308 A1 | 6/2016 | Bill | |
| 2017/0168664 A1 | 6/2017 | Kashyap | |
| 2018/0088925 A1 | 3/2018 | Emeis et al. | |
| 2018/0157928 A1 | 6/2018 | Oliveira et al. | |
| 2018/0210929 A1 | 7/2018 | Mukherjee et al. | |
| 2018/0287876 A1 | 10/2018 | Scott et al. | |
| 2018/0316568 A1 | 11/2018 | Gill et al. | |
| 2019/0121801 A1 | 4/2019 | Jethwa | |
| 2019/0215248 A1 | 7/2019 | D'Ippolito | |
| 2020/0162380 A1 | 5/2020 | Pilkington | |
| 2020/0296017 A1 | 9/2020 | Mazzitelli et al. | |

OTHER PUBLICATIONS

Heiko Rupp, "Observe What Your Istio Microservices Mesh Is Doing with Kiali", https://developers.redhat.com/blog/2018/09/20/istio-mesh-visibility-with-kiali/, Sep. 20, 2018, 10 pages.

John Mazzitelli, "Different Mesh Visualizations in Kiali", https://medium.com/kialiproject/different-mesh-Visualizations-in-kiali-82a3428ae155, Sep. 15, 2018, 9 pages.

Chris Ward, "DZONE'S Guide to Microservices: Breaking Down the Monolithx", http://enos.itcollege.ee/~jpoial/allalaadimised/reading/microservicesguide-2017.pdf, 2017, 49 pages.

USPTO, Notice of Allowance for U.S. Appl. No. 16/257,482, dated Feb. 7, 2020.

USPTO, Office Action for U.S. Appl. No. 16/890,388, dated Oct. 29, 2020.

USPTO, Notice of Allowance for U.S. Appl. No. 16/890,388, dated May 13, 2021.

* cited by examiner

DYNAMIC VISUALIZATION OF REQUESTS TRAVELING THROUGH A MICROSERVICE MESH

TECHNICAL FIELD

Embodiments of the present disclosure relate to computing systems, and more specifically, relate to the dynamic visualization of requests traveling through a microservice mesh.

BACKGROUND

Microservices are processes, such as instances of executable software modules, which handle responses for client requests. For example, a client sends a request and a microservice can generate a response to that request. Utilization of microservices allows for complex applications to be broken down into relatively simple and independent processes, which produces highly-decoupled systems.

BRIEF DESCRIPTION OF THE DRAWINGS

The disclosure is illustrated by way of example, and not by way of limitation, and can be more fully understood with references to the following detailed description when considered in connection with the figures, in which.

DETAILED DESCRIPTION

Figure 1:
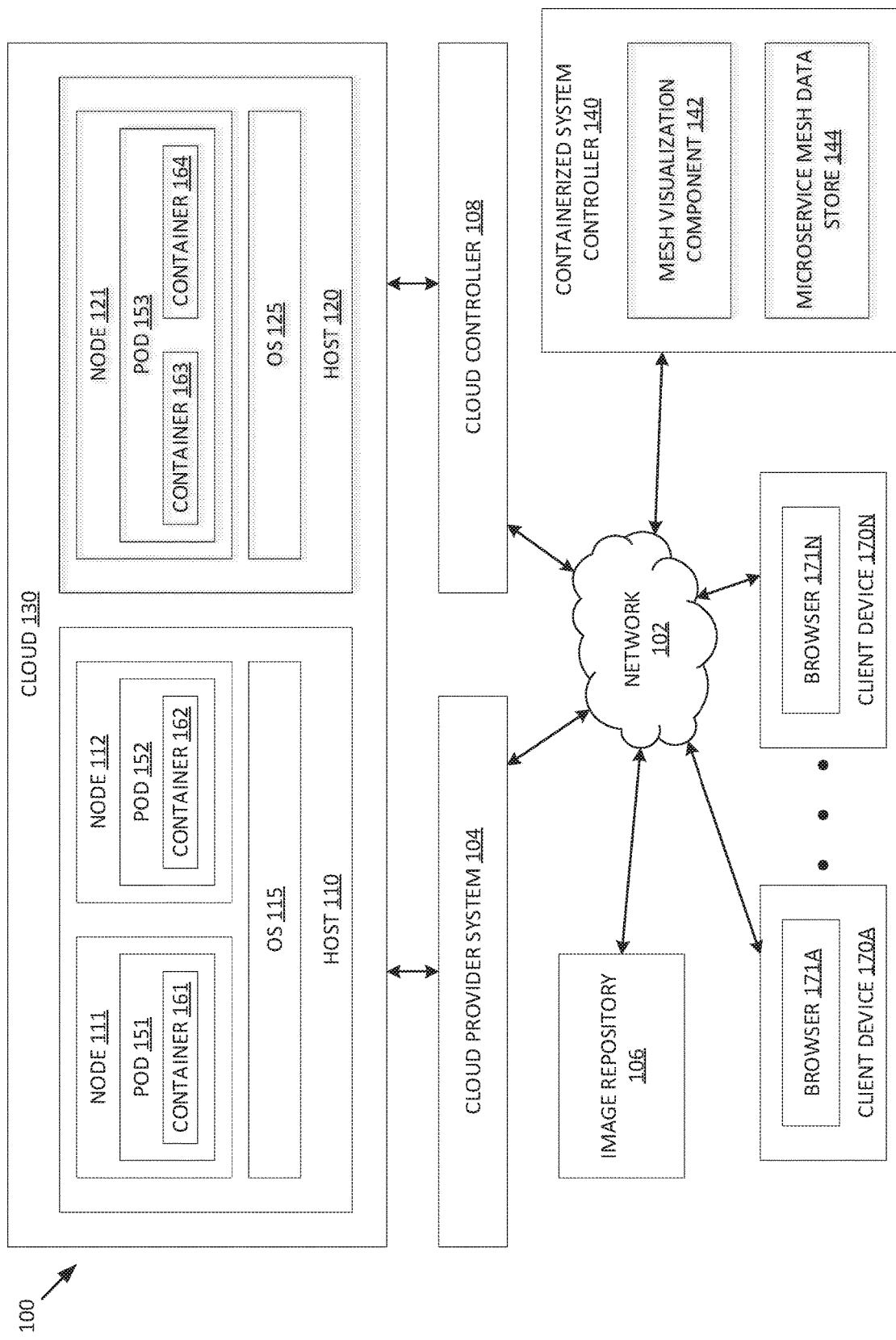
FIG. 1 illustrates a high-level component diagram of an example architecture, in accordance with one or more aspects of the present disclosure.

Described herein are methods and systems for dynamic visualization of requests traveling through a microservice mesh. A microservice mesh topology is a representation of the interrelations and/or arrangements of a microservice mesh. A microservice mesh (also referred to as a microservices mesh or a service mesh) refers to a collection of microservices (also referred to as services), which are processes (such as instances of executable software modules) that handle responses for client requests. In some instances the client can be an application (e.g., a user application) or a microservice. Microservices can be deployed in a microservice mesh in a clustering technology. In an illustrative example, a microservice mesh can include a collection of microservices for an application that provides information regarding a book available for purchase to a user of the application. A client device associated with the user can be configured to display information about the book (e.g., via a web browser) having a description of the book, book details (e.g., author, ISBN, number of pages, title, etc.), and book reviews.

A containerized computing services platform, such as a platform-as-a-service (PaaS) system, can implement microservices of the microservice mesh. Containerization refers to an operation system (OS)-level virtualization environment of a host machine that enables isolation of a microservice process. The microservices can be executed in containers to create containerized applications in the containerized computing services platform. Each microservice process is dedicated to performing a relatively simple task to support the application for each individual container. In accordance with the previous example, the example book application can be broken into three separate microservices: a product page microservice, a book details microservice, a book reviews microservice.

A microservice mesh can include a number of different components (e.g., a workload, a service, an application, etc.) that represent different microservices. A workload can be, for example, a pod of a cluster of the containerized computing services platform. A pod refers to a group of one or more containers that are deployed together on the same node (i.e., a group of physical or virtual computing resources). Workloads are responsible for handling the requests within the microservice mesh. For example, a workload can process HyperText Transport Protocol (HTTP) requests and return HTTP responses. A service refers to a named endpoint that receives requests (e.g., from a user, a microservice, etc.) and routes the requests to one or more applications. An application can be made of one or more workloads associated with a particular label. In accordance with the previously example, if a workload has a label of "app=details," a service receiving a request including the same or a similar label will transfer the request to be handled by the workload or the application associated with the "details" label.

A user of the microservice mesh (e.g., an engineer, an operator, a developer, etc.) may wish to visualize the connections between each microservice. For example, a particular component of the microservice mesh may cause a performance metric for the mesh to decrease below a threshold value. A performance metric can include a response time, a response latency, a number of requests processed within a unit of time, etc. The user may wish to visualize the microservice mesh to more easily identify one or more components that are causing the performance metric for the mesh to decrease. In some systems, a processing device can generate a visualization for the microservice mesh and provide the visualization to a client device of the user. The visualization can include vertices connected by edges. Each vertex can represent a component of the microservice mesh (e.g., a workload, a service, an application, etc.) and each edge can represent requests transmitted from one component to another component. In some systems, the visualization can also include an indication of a performance metric for each component of the microservice mesh. For example, the visualization may include a flag for a particular application that indicates errors have occurred while requests are handled by the particular application.

In some implementations, the microservice mesh visualization may allow the user to identify one or more components that are contributing to the decrease in the mesh performance metrics. However, the user may not be able to determine why a particular component is contributing to the decrease in mesh performance. For example, an application may perform particular operations while handling a particular type of request, and these operations can cause performance metrics for the microservice mesh to decrease below the threshold value. Various implementations of microservice mesh visualization may not provide any indication of the particular type of request that is causing the performance metrics to decrease. As such, the user is not able to determine, based on the microservice mesh visualization, that operations associated with the particular type of request needs to be addressed in order to improve performance of the microservice mesh. As a result, a user may spend additional time and resources trying to identify the particular type of request that is causing the performance metrics to decrease. In some instances, the user may not be able to quickly identify the type of request that is causing the problem, and the problem is not quickly fixed. This causes the overall latency for processes at the microservice mesh to increase and the overall efficiency for processes decreases.

Implementations of this disclosure address the above-mentioned and other deficiencies by providing dynamic visualization of requests traveling through a microservice mesh. A mesh visualization component can receive a request (e.g., from a client device) for a graphical visualization of a microservice mesh. The mesh visualization component can obtain information associated with each service operating on nodes of the microservice mesh and can determine, based on the information, various types of requests that are received by each service and the operations that are performed by an application and/or a workload handling the requests. For example, with respect to the book application described previously, the mesh visualization component can determine that requests for details of a book can include a request for the author of the book, the ISBN for the book, the number of pages of the book, the title of the book, and so forth. Workloads of the book application can perform particular operations when handling each type of request.

The mesh visualization component can generate the graphical visualization to include a first set of vertices that each correspond to a particular service of the microservice mesh and a second set of vertices that each correspond operations associated with a type of request received by each service. For example, the first set of vertices can include a first vertex corresponding to a book details service (referred to as a service vertex) and/or a second vertex corresponding to a book details application that handles requests for book details received by the book details service (referred to an application vertex). Vertices of the second set of vertices (referred to as operation vertices or request vertices herein) can each correspond to operations performed by an application and/or a workload handling a particular type of book details request (e.g., a book author vertex, an ISBN vertex, a number of pages vertex, etc.). Each operation vertex can be connected to the service vertex (or the application vertex) by an edge that represents the flow of requests having the particular type associated with a respective operation vertex.

The graphical visualization can be presented to a user via a graphical user interface (GUI) of a client device. In some embodiments, the GUI can include one or more GUI elements configured to present performance information associated with each type of request received by a service of the microservice mesh. For example, the GUI can include one or more flags at vertices or edges of the graphical visualization that is indicative of one or more performance metrics of a component of the microservice mesh is decreasing below a threshold value. In some embodiments, the GUI can include the flags at particular operation vertices that are associated with operations that are causing the performance metrics to decrease. A flag at a particular operation vertex can indicate to the user that an error is occurring with respect to the operations performed by applications and/or workloads handling these types of requests represented by the particular operation vertex. In another example, a user can select (e.g., click on) either a operation vertex or an edge connecting the operation vertex to the service vertex (or application vertex) to request performance data associated with handling the particular types of request represented by the service vertex. The client device can present, via the GUI, performance data for performing operations associated with the particular type of request.

Accordingly, aspects of the present disclosure enable a user of a microservice mesh to more easily identify a source of a problem at components of the microservice mesh. The mesh visualization component can generate a graphical visualization that includes operation vertices corresponding to different types of requests received by services of the microservice mesh. Each type of request can correspond to different operations performed by an application and/or a workload handling the received request. By including the operation vertices in the graphical visualization of the microservice mesh, a user is able to easily identify the particular operations that are causing a decrease in performance metric values for the microservice mesh and can address problems associated with the particular operations more efficiently. As a result, the overall latency of processes performed at the microservice mesh decreases and the overall efficiency of processes performed at the microservice mesh increases. In addition, the graphical visualization can also give the user a detailed view of each type of request that is handled at the microservice mesh, which can help the user identify opportunities to optimize the microservice mesh more quickly and efficiently.

FIG. 1 illustrates a high-level component diagram of an example system architecture 100, in accordance with one or more aspects of the present disclosure. In some embodiments, system architecture 100 can be used in containerized computing service platforms, such as a Platform-as-a-Service (PaaS) system (e.g., OpenShift®). The PaaS system can provide resources and services (e.g., microservices) for the development and execution of applications owned or managed by multiple users. The PaaS system provides a platform and environment that enables users to build applications and services in clustered computing environment. Although implementations of the present disclosure are described in accordance with a particular type of system, this should not be considered as limiting the scope or usefulness of the features of this disclosure. For example, the features and techniques described herein can be used with other types of multi-tenant systems and/or other containerized computing service platforms.

As shown in FIG. 1, service architecture 100 includes cloud computing environment 130 (referred to herein as a cloud) that includes nodes 111, 112, and 121 to execute applications and/or processes associated with applications. A node refers to a group of physical or virtual computing resources that provide computing functionality serving as the execution environment for an application of the PaaS system. In some embodiments, a "node" can refer to a virtual machine (VM) that is hosted on a physical machine, such as host 110 or host 120 located in a data center. For example, physical machines of host 110 can host nodes 111 and/or 112 in cloud 130 provided by cloud provider system 104. In such embodiments, an operating system (OS) (e.g., OS 115, 125) running on a host machine 110, 120 can execute the VM. In some embodiments, an environment other than a VM may execute functionality of the PaaS system.

In some embodiments, host machines 110, 120 are located via a server at a data center. A server can include one or more processing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to implement secure communication, in accordance with the present disclosure. Each server can include hardware components, such as a physical central processing unit (CPU). One or more processor devices can be and/or include a micro-processor, digital signal processor (DSP), or other processing components. Each CPU can process various received data and can carry out the code or instructions or one or more computer programs, for example, to provide input/output operations specified by the instructions.

Each server can further include memory. Memory can include volatile memory devices (e.g., random access memory (RAM)), non-volatile memory devices (e.g., flash memory), storage devices (e.g., a magnetic hard disk, a Universal Serial Bus (USB) solid state drive, a Redundant Array of Independent Disks (RAID) system, a network attached storage (NAS) array, etc.), and/or other types of memory devices. It should be noted that even though each server can include a single CPU, this is merely illustrative, and that in some other examples, each server can include a two or more CPUs. Similarly, in some other examples, each server can include two or more memory components, rather than a single memory component.

Users can interact with applications executing on nodes 111, 112, 121 using client computer systems, such as client devices 170A-N. For example, users can access applications executing on nodes 111, 112, 121 via web browsers 171A-N on respective client devices 170. In other or similar embodiments, hosts 110, 120 may directly host the applications without the user of VMs (e.g., a "bare metal" implementation). In such embodiments, hosts 110, 120 may be referred to as "nodes."

Client devices 170 can be connected to hosts 110, 120 in cloud 130 and cloud provider system 104 via a network 102. The network 102 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Each client device 170 can include a computing device such as a personal computer (PC), a laptop, a mobile phone, a smart phone, a table computer, a netbook computer, a network-connected television, etc. In some implementations, client devices 140A-N can also be referred to as a "client computing device" or a "user device."

In some embodiments, cloud provider system 104 can be coupled to cloud controller 108 via network 102. Cloud controller 108 can reside on one or more machines (e.g., server computers, desktop computers, etc.) and may manage the execution of applications in the cloud 130. Cloud controller 108 can receive commands from containerized system controller 140. In some embodiments, cloud controller 108 can provide data (e.g., pre-generated images) associated with different applications to cloud provider system 104 in view of the commands. The data can be provided to cloud provider system 104 and can be stored at image repository 106, in an image repository (not shown) located on each host 110, 120, or in an image repository (not shown) located on each node 111, 112, 121. This data may be used for the execution of applications for a containerized computing services platform managed by the containerized system controller 140.

In some embodiments, the data can be used for execution of containers 161, 162, 163, 164 in one or more pods 151, 152, 153. A pod refers to a group of one or more containers that are deployed together on the same node and are the smallest compute unit that can be defined, deployed, and managed in the containerized computing service environment. Each pod 151, 152, 153 is allocated its own IP address, with containers 161, 162, 163, 164 within pods 151, 152, 153 being able to share local storage and networking. Pods 151, 152, 153 can have a life cycle that is defined by and can run on nodes 111, 112, 121, respectively, until the pod's containers exit or are otherwise removed.

Containers 161, 162, 163, 164 can include application images built from pre-existing application components and source code of users managing the application. An image refers to data representing executables and files of an application used to deploy functionality for a runtime instance of the application. In one embodiment, the image can be built using a Docker™ tool and is referred to as a Docker image. In other or similar embodiments, the application images can be build using other types of containerization technologies. A container 161, 162, 163, 164 is a secure process space on nodes 111, 112, 121 to execute functionality of an application. In some implementations, a container 161, 162, 163, 164 is established at nodes 111, 112, 121 and has access to certain resources (e.g., memory and/or storage) of a respective underlying node. In some embodiments, containers 161, 162, 163, 164 may be established using the Linux Containers (LXC) method. In further embodiments, containers 161, 162, 163, 164 may be established using cgroups, SELinux™, and kernel namespaces, to name a few examples.

In some embodiments, containerized system controller can implement a mesh visualization component 142. Mesh visualization component 142 can provide visualizations of a microservice mesh implemented by containerized system controller 140 via nodes 111, 112, 121. For example, nodes 111, 112, 121 can be utilized to implement a service mesh that deploys microservices via pods 151, 152, 153. Pods 151, 152, 153 can provide the workload of the microservices of the mesh, as discussed herein. Mesh visualization component 142 an provide the visualizations of the microservice mesh to one or more requesting users at client device 170. For example, in response to a request for a graphical visualization of a microservice mesh, mesh visualization component 142 can transmit generated visualization data for the graphical visualization to client device 170 to be rendered via a GUI for display to the requesting user using, for example, browser 171A-N and client devices 170A-N.

A microservice mesh can include components such as workloads, applications, and services. Each component can be represented in a graph of directed vertices with each vertex corresponding to a microservice of the microservice mesh. Vertices of the microservice mesh graph can be connected to one another based on a communication between components. For example, if a microservice, represented by vertex A, sends a request to an application for another microservice, represented vertex B, the microservice mesh graph can include vertices A and B connected via an edge.

In some embodiments, the microservice mesh graph can also include vertices that represent the types of requests received by a microservice. In accordance with the previous example, the microservice represented by vertex A can send a first type of request and a second type of request to the application for the other microservice. The microservice mesh graph can include additional vertices indicating the first type of request and the second type of request each connected via an edge to vertices A and B. Further details regarding vertices representing types of requests received by a microservice are provided in further detail with respect to FIGS. 3A-3C.

Mesh visualization component 142 can generate graphical visualizations of the microservice mesh based on the metadata for each microservice. Microservice metadata can be stored at a microservice mesh data store 144 maintained by containerized system controller 140. Although FIG. 1 depicts data store 144 as part of containerized system controller 140, data store 144 can be maintained separately from containerized system controller 140.

Figure 2:
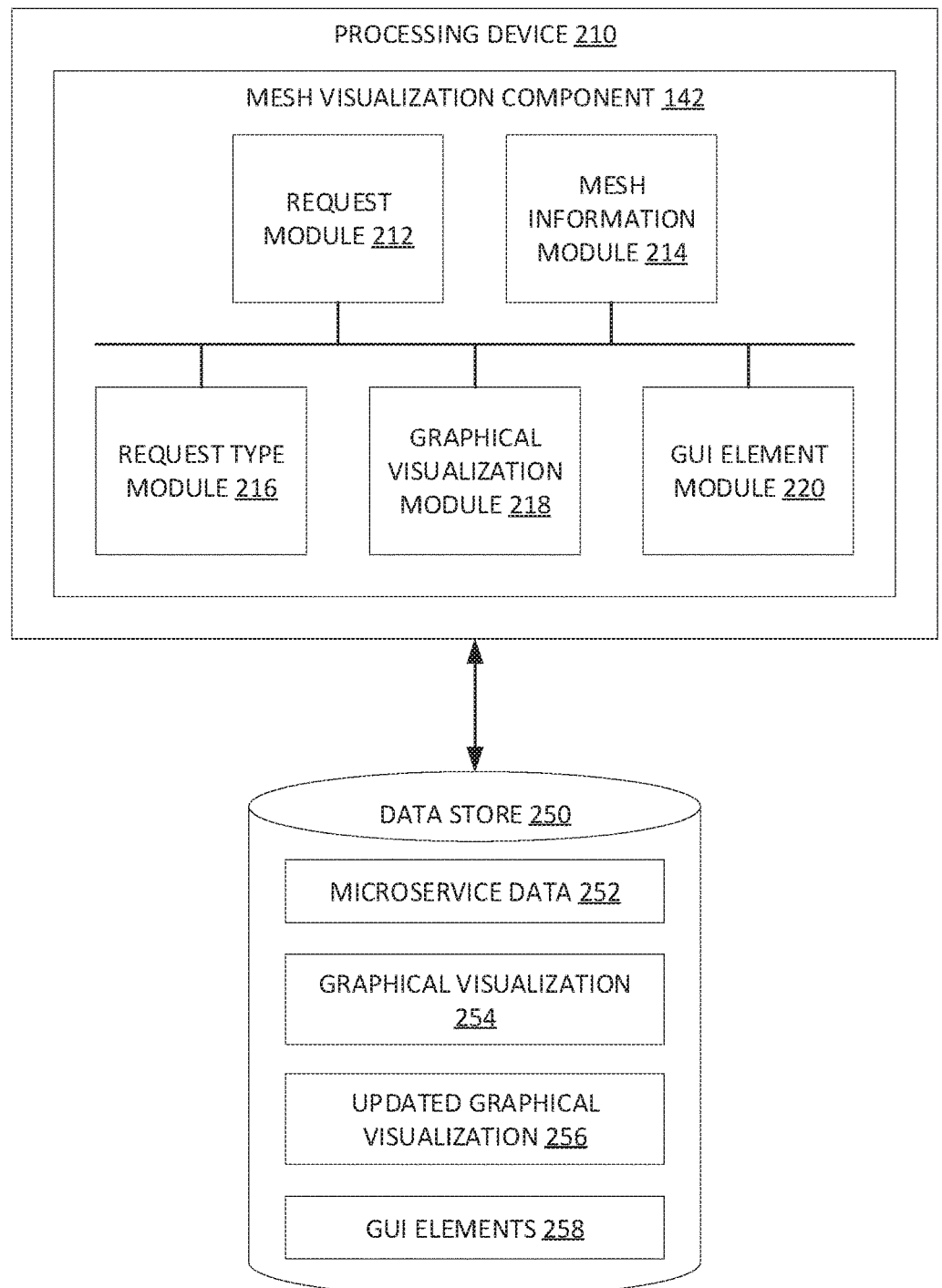
FIG. 2 depicts a block diagram of an example processing device executing a mesh visualization component, in accordance with embodiments of the present disclosure.

FIG. 2 depicts a block diagram illustrating an example 200 of a processing device 210 executing a mesh visualization component 142, in accordance with embodiments of the present disclosure. In some embodiments, the processing device 210 can be part of containerized system controller 140, described with respect to FIG. 1. Processing device 210 can be coupled to memory that includes data store 250. In some embodiments, data store 250 can correspond to data store 144 of FIG. 1, or can correspond to a different data store. As illustrated, mesh visualization component 142 can include a request module 212, a mesh information module 214, an request type module 216, a graphical visualization module 218, and a GUI element module 220. In some embodiments, data store 250 can store microservice data 252, a graphical visualization 254, an updated graphical visualization 256, and GUI elements 258.

Request module 212 can handle requests from a client device (e.g., client device 170) for a graphical visualization of a microservice mesh. A graphical visualization can include one or more sets of vertices each representing a different component (e.g., a workload, an application, a service, etc.) of the microservice mesh. Each vertex of the graphical representation can be connected to another vertex by an edge representing a flow of requests received by a particular service. For example, a first vertex can correspond to an application and a second vertex can correspond to a microservice. A directed edge from the first vertex to the second vertex can correspond to a flow of requests (e.g., a HTTP request) received by the microservice from the application.

In some embodiments, request module 212 can receive a request for a particular type of graphical visualization. A type of graphical visualization for a microservice mesh can include a workload graph, an application graph, a versioned application graph, or service graph. A workload graph can provide a detailed view of communication between workloads executing at the microservice mesh. As discussed previously, a workload refers to a pod of a cluster of a containerized computing services platform that is responsible for handling requests within the microservice mesh. A set of vertices of a workload graph can correspond to each workload of the microservice mesh and each edge connecting a vertex of the workload graph can correspond to a request transmitted from a service associated with a particular workload to another service. An application graph provides a detailed view of each application in the microservice mesh. An application graph can include a set of vertices that each represent an aggregation of workloads that are associated with the same application label. A versioned application graph is similar to the application graph, except that the set of vertices each represent an aggregation of workloads that are associated with a particular version of an application. For example, one vertex can represent an aggregation of workloads for a first version of an application while another vertex represents an aggregation of workloads for a second version of the application. A service graph provides a high-level view of all traffic for services of the microservice mesh. A service graph can include a set of vertices that each correspond to a particular service of the microservice mesh. In some embodiments, a service graph can also include a set of vertices that each correspond to an application or a workload associated with each service. Each type of graphical visualization for the microservice mesh can also include a set of vertices that correspond to a type of request received by a microservice, in accordance with embodiments described herein.

In response to request module 212 receiving a request for a graphical visualization of a microservice mesh, mesh information module 214 can obtain information associated with each microservice of the microservice mesh. In some embodiments, information for a particular microservice can include an indication of one or more applications and/or workloads associated with the microservice. The information can also include an indication of one or more other microservices that have transmitted requests to the particular microservice. In some embodiments, information for the microservice can also include performance data associated with one or more requests handled by an application and/or workload associated with the microservice. Performance data can include a number or rate of requests received by the microservice (referred to as a request rate), an amount of time the application and/or workload handles each request (referred to as a response time), an amount of resources consumed at one or more nodes while the application and/or workload handles each request (referred to as node resource consumption), and so forth.

In some embodiments, mesh information module 214 can obtain information associated with each microservice (e.g., from data store 144) and store the information as microservice data 252 at data store 250. In other or similar embodiments, mesh visualization component 142 can maintain information associated with each microservice as microservice data 252 at data store 250. In such embodiments, mesh information module 214 does not obtain the information from data store 144 and instead accesses microservice data 252 stored at data store 250.

Request type module 216 can determine each type of requests received by microservices of the microservice mesh. In some embodiments, each request can be categorized according to one or more operations performed by a workload and/or application handling the request. In an illustrative example, a microservice mesh can be configured to provide a travel planning service to one or more users via client device. The microservice mesh can include a travel agent service that receives requests from client devices for particular information used to plan a vacation. For example, the travel agent service can provide a user with a list of countries associated with discount packages offered by the travel agent service. In another example, the travel agent service can query a hotel booking service or a rental car booking service to obtain pricing quotes for a hotel or a car rental, respectively, and provide the client device with the pricing quote received from the services. A first type of request received by the travel agent service can be a request to provide a list of destinations associated with discount packages and a second type of request can be a request for a hotel or a car rental quote. Each type of request can be categorized according to one or more operations performed by a workload handling the request.

In some embodiments, request type module 216 can determine the type of requests received by a microservice of the microservice mesh based on one or more operations executed by the application and/or workload associated with the microservice to handle the request. For example, to handle a request for a list of destinations associated with discount packages, a workload can execute an operation associated with looking up the list from a memory device. Based on the operation executed by the application and/or workload, the request type module 216 can associate the request as having a "packagelist" type. In another example, to handle a request for a price quote for a hotel, a workload can execute an operation associated with transmitting a request for a hotel price to the hotel booking service. Request type module 216 can associate the request as having a "pricequote" type. In other or similar embodiments, request type module 2116 can determine the type of requests received by the microservice based on one or more labels included in the request. For example, the request for the list of destinations can include a label of "packagelist" (e.g., in a particular path or field of the request). As such, request type module 216 can determine the type of the request based on the label.

Figure 3A:
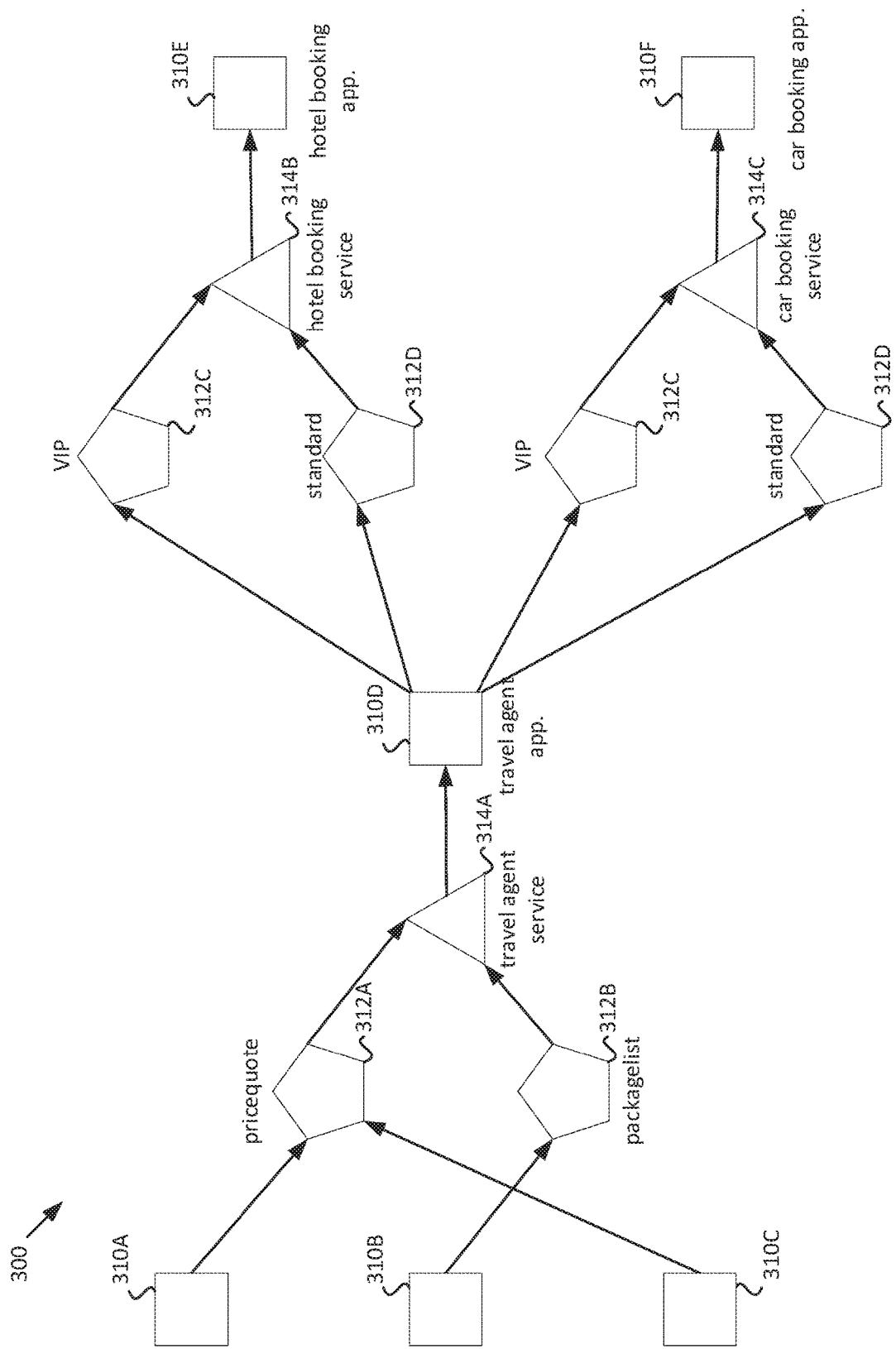
FIGS. 3A-3C depict example visualizations of operations traveling through a microservice mesh, in accordance with embodiments of the present disclosure.

Graphical visualization module 218 can generate the graphical visualization 254 of the microservice mesh based on microservice data 252. In some embodiments, graphical visualization 254 can include vertices corresponding to a workload graph (i.e., workload vertices and operation vertices), an application graph (i.e., application vertices and operation vertices), a versioned application graph (i.e., versioned application vertices and operation vertices), or a service graph (i.e., application and/or workload vertices, service vertices, and operation vertices). FIG. 3A illustrates a graph 300 generated by graphical visualization module 218 for the example travel planning service described previously. In FIG. 3A, an application vertices 310 are each represented by a "square" vertex, operation vertices 312 are each represented by a "pentagon" vertex, and service vertices 314 are each represented by a "triangle" vertex. Each edge of graph 300 indicates a flow of requests transmitted by an application vertex to a service vertex, in accordance with embodiments described above.

Applications can each transmit requests to the travel agent service. Each transmitted request can correspond to a different request type (i.e., a "packagelist" type or a "pricequote" type). As illustrated in FIG. 3A, graph 300 can include application vertices 310A-C, representing each application transmitting a request to the travel agent service, represented by service vertex 314A. Operation vertices 312A-B, placed between vertices 310A-C, and vertex 314A, represent the types of requests received by the travel agent service. Graph 300 can include edges directed from application vertices 310A-C to a respective operation vertex 312A-B based on the type of request transmitted by the application to the travel agent service. Graph 300 can also include edges directed from operation vertices 312A-B to service vertex 314A.

As described previously, in response to receiving a request, a service of a microservice mesh transmits the request to an application or workload responsible for handling the request. Graph 300 can include an edge from service vertex 314A and application vertex 310D, represent-ing the travel agent application. The edge between vertex 314A to vertex 310D represents the transfer of requests from the travel agent service to the travel agent application that is responsible for handling the requests.

The travel agent application can determine whether a request for a price quote is a request for a hotel price quote or for a car price quote and transmit the request to the appropriate booking service based on this determination. In some instances, the travel agent application can transmit requests for different types of price quotes to the hotel booking service and/or the car booking service. For example, the travel agent application can transmit a "VIP" price quote or a "standard" price quote. Graph 300 can include operation vertices 312C-D that correspond to the "VIP" price quote or the "standard" price quote, respectively. Graph 300 can include an edge from application vertex 310D to vertices 312C-D and an edge to service vertex 314B, corresponding to the hotel booking service, and 314C, corresponding to the car booking service. Graph 300 can further include an edge from service vertices 314B-C to application vertices 310E-F, representing the hotel booking application and the car booking application, respectively.

Figure 3B:
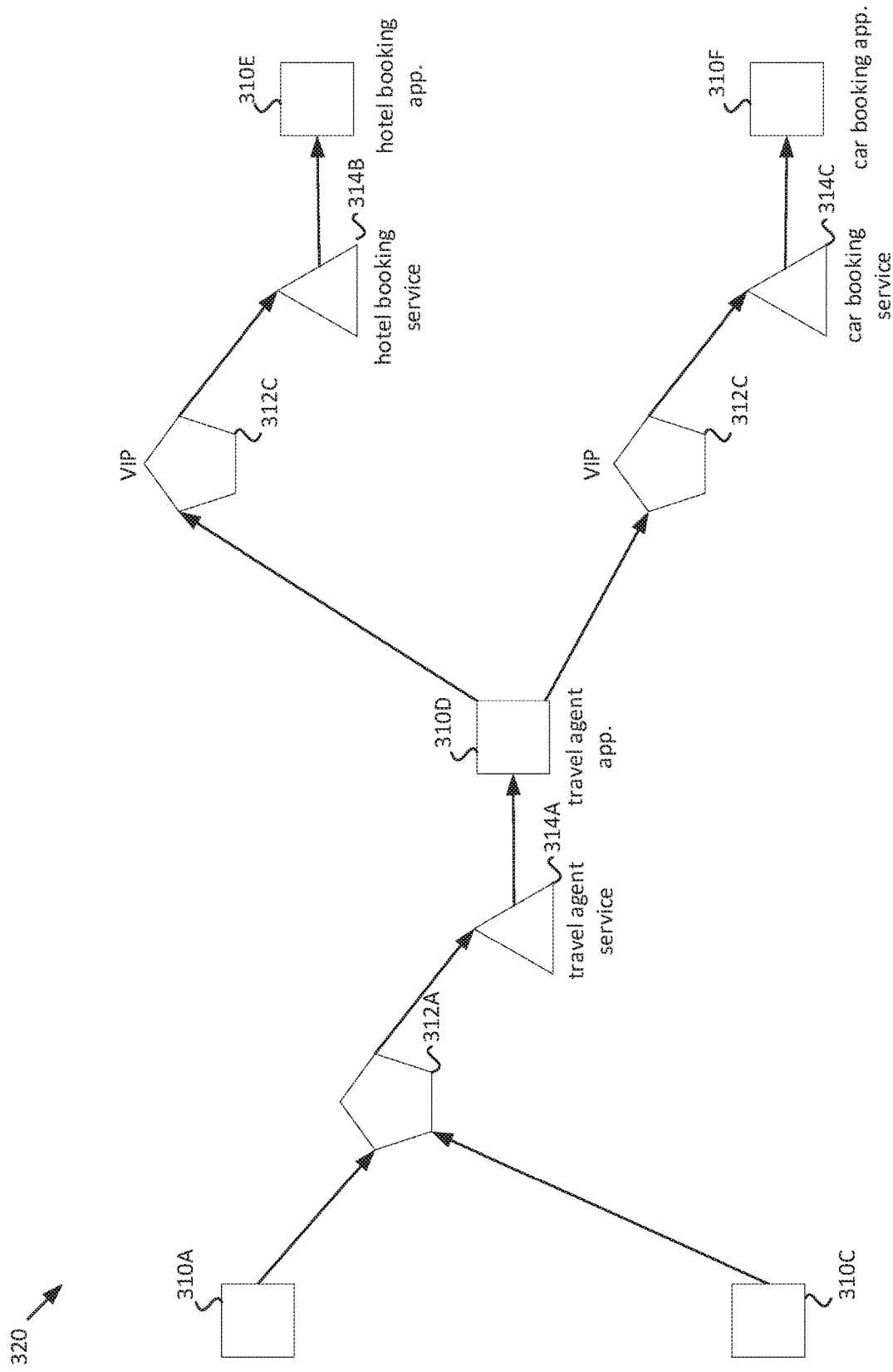

As illustrated in FIG. 3A, graph 300 can include vertices for each application, service, and type of request received by a service. In some embodiments, graphical visualization module 218 can generate an updated graphical visualization for the microservice mesh that only includes vertices associated with a particular type of request or type of operation (e.g., in response to a user request). In such embodiments, graphical visualization module 218 can generate an updated graphical visualization that does not include vertices corresponding to applications, services, or request that are not associated with the particular type of request or operation. FIG. 3B illustrates an updated graph 320, which includes vertices that are associated with a "pricequote" type of request. As such, updated 320 does not include vertices or edges that are not associated with the "pricequote" type of request. As illustrated in FIG. 3B, graph 320 does not include operation vertex 312A corresponding to the "packagelist" type of request. Similarly, graph 300 does not include application vertex 310B, as the application associated with vertex 310B transmitted the "packagelist" type of request, as illustrated in FIG. 3A. In one example, updated graph 320 may only include edges or vertices that are associated with a "VIPpricequote" type of request. As such, graph 320 does not include edges or vertices associated with a "standardpricequote" type of request (e.g., operation vertices 312D).

Figure 3C:
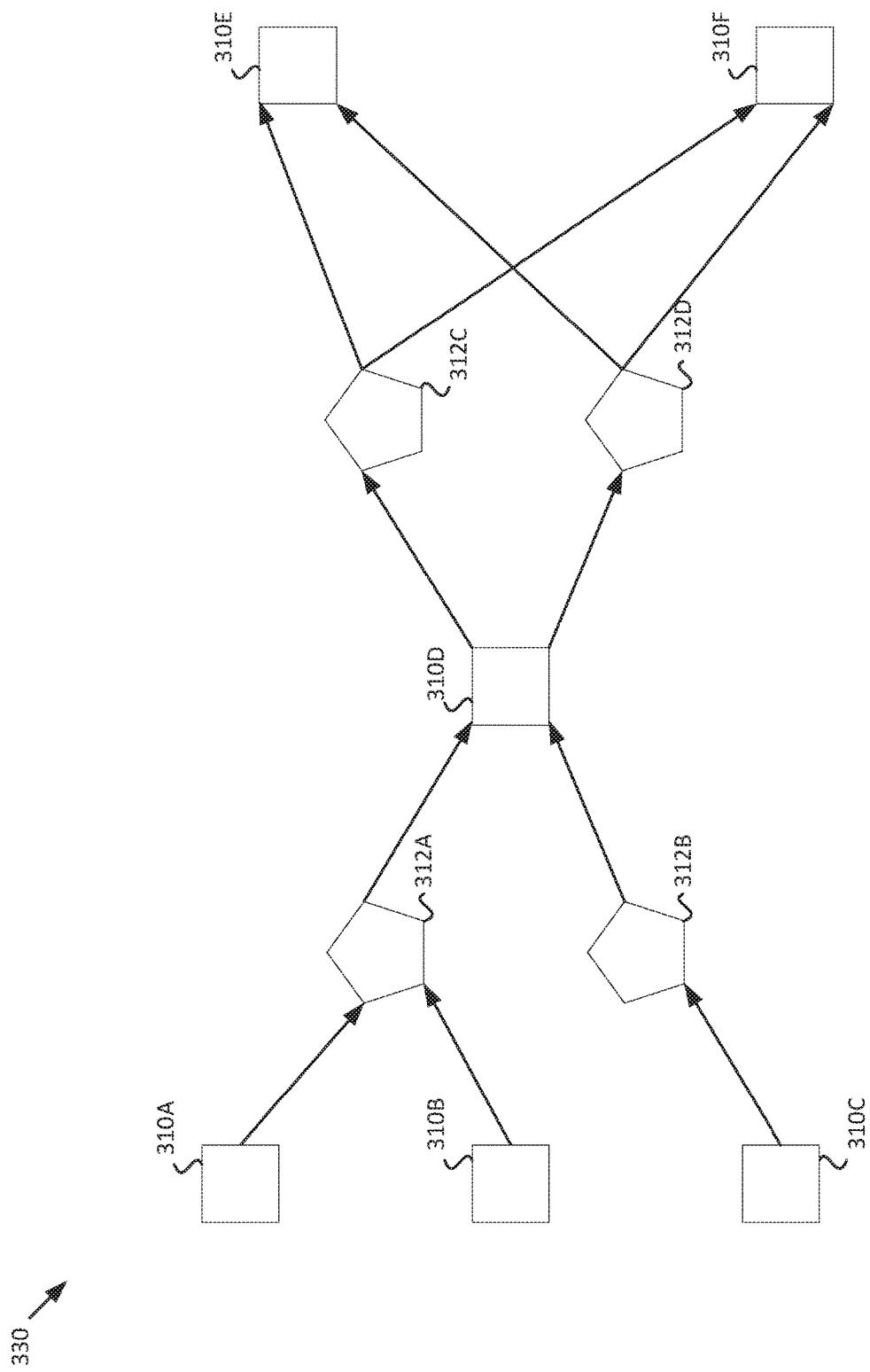

FIG. 3C illustrates another graph 330 generated by graphical visualization module 218. As seen in FIG. 3C, graph 330 corresponds to an application type graph, as graph 330 includes application vertices 310 and operation vertices 312. Graph 330 includes application vertices 310 for each application of the travel planning service and operation vertices 312 for each type of request transmitted by an application, in accordance with previously described embodiments. Edges of graph 330 correspond to each request transmitted from an application to a service. As graph 330 does not include any service vertices 314, duplicate operation vertices 312 corresponding to particular services (e.g., vertices 312C for hotel VIP pricing requests and car VIP pricing requests, or vertices 312D for hotel standard pricing requests and car standard pricing requests) can be consolidated into a single vertex corresponding to the type of request. For example, as illustrated in FIG. 3C, vertices 312C for hotel VIP pricing requests and car VIP pricing requests 312D that were indicated as separate vertices (i.e., for the hotel booking service and the car booking service) in graph 300 are indicated as consolidated vertices in graph 320.

In some embodiments, graphical visualization module 218 can update the graphical visualization 254 of the microservice mesh. For example, mesh information module 214 can obtain new or updated data associated with the microservice mesh. In some instances, the new or updated data can correspond to a request that was sent to a microservice. Request type module 216 can determine the request that corresponds to a new type of request (i.e., a type of request that is not represented by a operation vertex 312 at graphical visualization 254). In response to request type module 216 determining the request corresponds to a new type of request, graphical visualization module 218 can generate an updated graphical visualization 256. The updated graphical visualization 256 can include a operation vertex 312 corresponding to the new type of request and an edge connecting the operation vertex 312 to a service vertex 314, representing the microservice that received the request. In some embodiments, the updated graphical visualization 256 can also include an edge connecting an application vertex 310, corresponding to the application that sent the request, to the operation vertex.

In some embodiments, graphical visualization module 218 can generate graphical visualization 254 without including any operation vertices 312. For example, graphical visualization module 218 can generate graphical visualization 254 to include application vertices 310 and service vertices 314. Each edge of graphical visualization 254 can connect a vertex 310 for an application that transmitted a request to a vertex 314 for the service that received the request. In some instances, request module 212 can receive a request, from a client device presenting the graphical visualization 254, for additional information associated with a particular edge or vertex 310, 314 of graphical visualization 254. In some embodiments, the client device can transmit the request to request module 212 in response to detecting a user interaction with a the particular edge or vertex 310 (e.g., via a user interface of the client device). In response to request module 212 receiving the request, mesh information module 214 can obtain information associated with an application, service, and/or workload corresponding to the particular edge or vertex 310, 314, in accordance with previously described embodiments. Request type module 216 can determine the types of requests that are transmitted by one or more applications to a service associated with the particular edge or vertex based on the obtained information. Graphical visualization module 218 can generate an updated graphical visualization 256 of the microservice mesh that includes operation vertices 312, as well as application vertices 310 and/or service vertices 314 that are associated with the particular edge or vertex 310, 314 of graphical visualization 254.

Figure 4A:
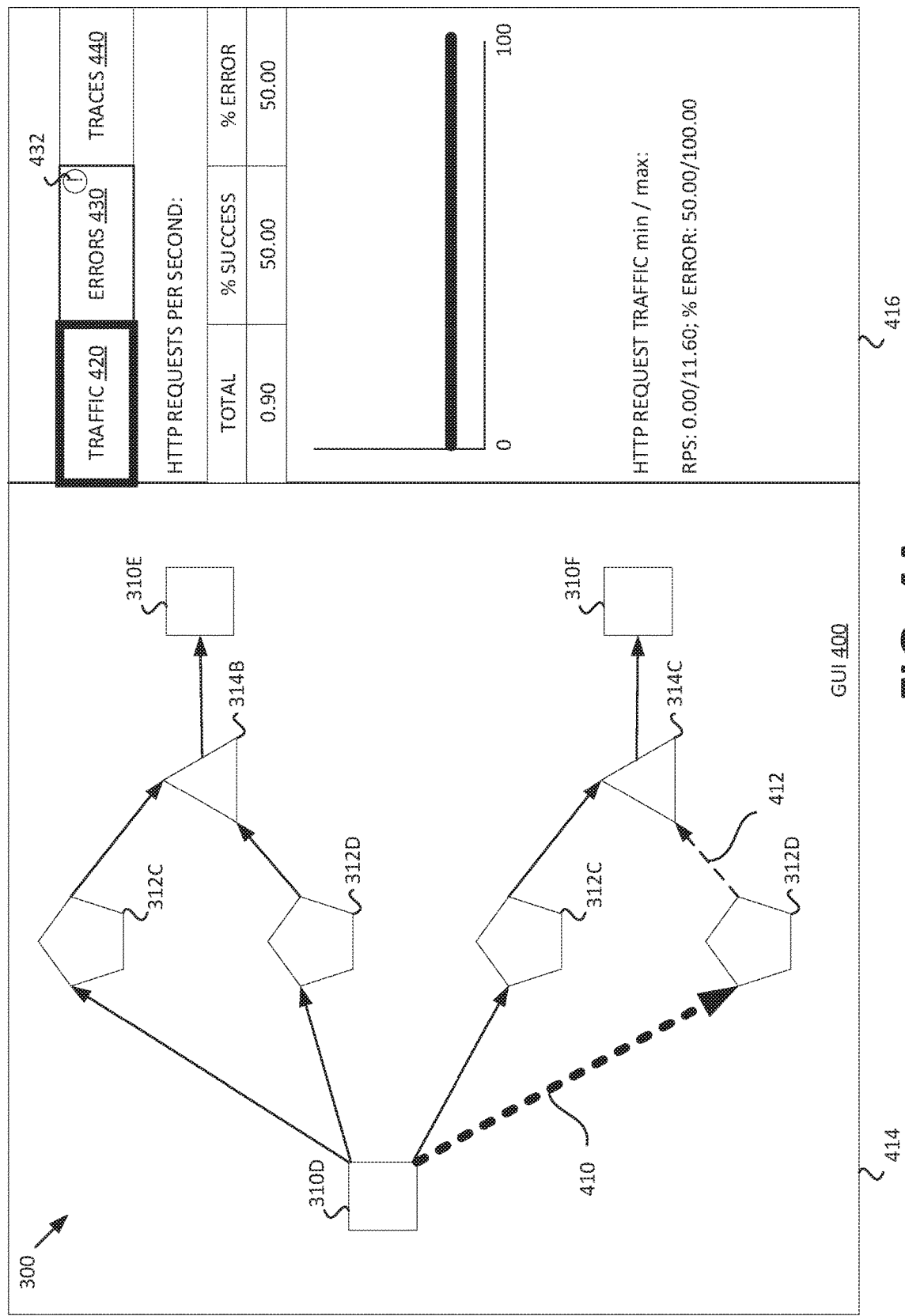
FIGS. 4A-4B illustrate example graphical user interfaces presenting visualizations of operations traveling through a microservice mesh, in accordance with embodiments of the present disclosure

In some embodiments, GUI element module 220 can generate one or more GUI components 258 to be presented with graphical visualization 254 and/or updated graphical visualization 256 at a client device. GUI element 258 can be any type of GUI element configured to provide information regarding a performance of components (e.g., workloads, applications, services, etc.) within a microservice mesh. FIG. 4A illustrates a graphical visualization 254 (or an updated graphical visualization 256) that is presented with GUI elements 258 via GUI 400 at a client device. Graphical visualization 254 (or updated graphical visualization 256) can include a portion of graph 300, described with respect to FIG. 3A. In some embodiments, a GUI element 258 can modify the presentation of a vertex or an edge of graphical visualization 254 via GUI 400. The modified presentation of a vertex or an edge of graphical visualization 254 can indicate, to a user, that a performance metric for one or more components of the microservice mesh does not satisfy a threshold value (e.g., errors are occurring at a particular application, etc.). GUI element 258 for edges 410 and 412 modifies edges 410 and 412 to be presented as dashed lines. The dashed lines of edges 410 and 412 are different from other edges of graph 300, indicating that a performance metric for an application and/or a workload handling a request associated with edges 410 and 412 does not satisfy a threshold value. Although GUI components 258 for edges 410 and 412 are presented as dashed lines in FIG. 4A, it should be noted that GUI component 258 can include any type of GUI element to differentiate a particular edge or vertex from other edges or vertices of graph 300 (e.g., colors, flags, etc.).

In some instances, graphical visualization module 218 can generate an updated graphical visualization 256 in response to detecting a performance metric for one or more components at the microservice mesh has changed. For example, mesh visualization component 142 can detect that a performance metric for a particular application has decreased below a threshold value. GUI elements module 220 can generate a GUI element 258 indicating that the performance metric has decreased below the threshold value and graphical visualization module 218 can cause the GUI element 258 to be presented with the vertex 310 associated with the particular application.

In some instances, a user of a client device can interact with a GUI element 258 to transmit a request for additional information associated with a particular component of the microservice mesh. For example, a user can interact with (e.g., click on) a GUI element 258 associated with edge 410 to obtain additional information associated with requests represented by edge 410. In response to receiving an indication of the user selection of edge 410, the client device transmits a request to mesh visualization component 142 for performance data associated with requests represented by edge 410. The client device can also modify GUI 400 to include a first portion 414 and a second portion 416. The first portion 414 can present graph 300, as previously described, and the second portion 416 can present the additional information associated with requests represented by edge 410. In some embodiments, a GUI element 258 associated with edge 410 can cause edge 410 to be presented as a highlighted or bolded line.

Mesh visualization component 142 can obtain performance data associated with requests represented by edge 410. As described previously, performance data can include a request rate, a response time, node resource consumption, and so forth. In response to receiving a request for performance data from a client device, mesh visualization component 142 can obtain microservice data 252 corresponding to the requests and can extract, from the microservice data 252, performance data associated with the requests. Mesh visualization component 142 can transmit the performance data to the client device, for presentation via GUI 400. In some embodiments, GUI element module 220 can generate one or more GUI elements 258 for presentation of the performance data and mesh visualization component 142 can transmit the generated GUI elements 258 to client device for presentation via GUI 400.

The client device can present the performance data for requests represented by edge 410 via the second portion 416 of GUI 400. The second portion 416 can include one or more windows each configured to present different information. For example, the second portion 416 can include a traffic window, a flags window, and a traces window. The traffic window can present data performance data associated with the traffic (i.e., transmission of requests from a first component to a second component) of requests represented by edge 410. The errors window can present data associated with one or more errors that have occurred while an application and/or a workload processed requests represented by edge 410. The traces window can present tracing data associated with requests represented by edge 410. It should be noted that, although descriptions of the present embodiment describe a traffic window, a errors window, and a traces window, any number of windows can be presented via the second portion 416 of GUI 400 and each window can present any data associated with components of the microservice mesh represented by graph 300.

In some embodiments, a user can select a particular window to view by selecting a GUI element 258 (e.g., a tab) associated with the window. For example, a user can select a traffic tab 420 to view the traffic window, a errors tab 430 to view the errors window, or the traces tab 440 to view the traces window. In other or similar embodiments, a particular window (e.g., the traffic window) can be presented via the second portion of 416 without any user interaction with GUI 400 (e.g., as a default window responsive to a user request for performance data). As illustrated in FIG. 4A, a user has selected the traffic tab 420 to view the traffic window at the second portion 416 of GUI 400. As a result, the client device modifies GUI 400 to present performance data for the request represented by edge 410 the second portion 416 of GUI 400. In some embodiments, one or more tabs 420, 430, 440 can include a GUI element 258 configured to alert a user to a particular window. For example, the errors tab 430 at the second portion 416 of GUI 400 can include a flag 432 to indicate that there are one or more errors associated with the requests represented by edge 410. Flag 432 can provide an alert to a user that the one or more errors have occurred and that he or she should select the errors tab 430 to review data associated with the one or more errors via the second portion 416 of GUI 400.

Figure 4B:
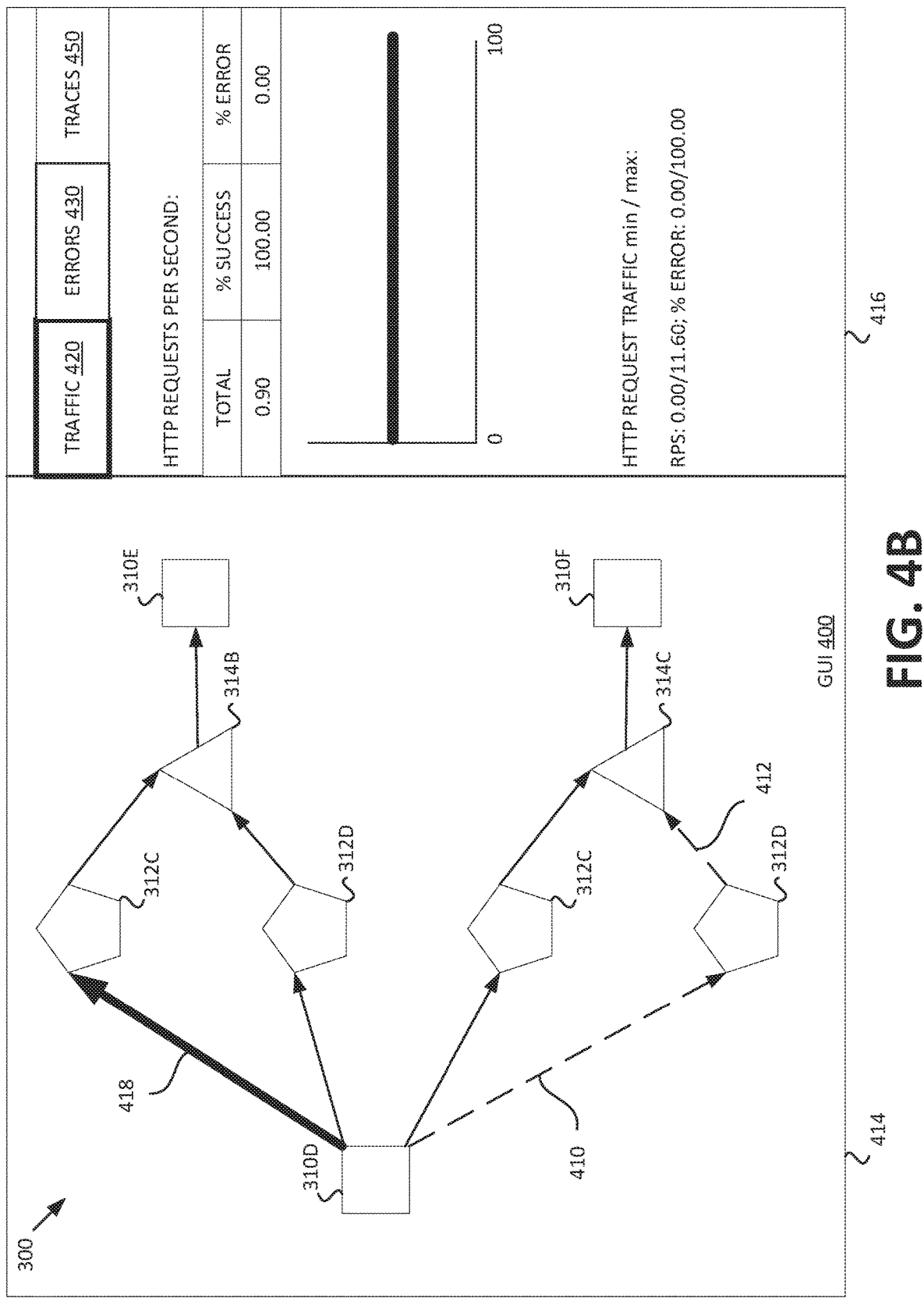

In some embodiments, a GUI element 258 for a vertex or edge of graph 300 can indicate that a performance metric for one or more components of the microservice mesh does satisfy a threshold value (e.g., no errors are occurring at a particular application, etc.). For example, GUI 400 can present each edge of graph 300, except for edges 410 and 412, as solid black lines. A client device can detect a user interaction with a GUI element 258 for a particular component and present performance data associated the component via a second portion 416 of FIG. 410, in accordance with previously described embodiments. For example, as illustrated in FIG. 4B, a GUI element 258 associated with edge 418 causes GUI 400 to present edge 418 as a solid black line, indicating that requests represented by edge 418 are associated with a performance metrics that satisfies a threshold value (e.g., no errors are detected with respect to processing the requests represented by edge 418). In response to detecting that a user has selected the GUI element 258 associated with edge 418, the client device can transmit a request to mesh visualization component 142 for performance data associated with the requests, in accordance with previously described embodiments. In some embodiments, GUI element 258 for edge 418 can cause GUI 400 to present edge 418 as a bolded black line, indicating that the user selected edge 418. In response to receiving the performance data from mesh visualization component 142, GUI 400 can cause the performance data to be presented via the second portion 416 of GUI 400, as previously described. As illustrated in FIG. 4B, performance data associated with the requests represented by edge 418 is presented via the traffic window 420. As mesh visualization component 142 has not detected any errors that have occurred with respect to processing the request of edge 418, GUI 400 may not cause flag 432 to be presented with errors tab 430.

GUI elements module 220 can generate other GUI elements 258 for presentation with a graphical visualization 254 at GUI 400. For example, a client device can transmit a request to mesh visualization component 142 for a location of a particular vertex of graph 300. In some embodiments, the request can include a request identifier. For example, a request for the location of vertex 310E can include a request identifier of "hotel booking application." Mesh visualization component 142 can determine a vertex identifier associated with the request identifier. The vertex identifier can indicate a particular location of the requested vertex at the graphical visualization. GUI elements module 220 can generate a GUI element 258 configured to indicate the location of the operation vertex at graph 300. In some embodiments, the GUI element 258 can include a highlighting element, a bolding element, a particular color element, and so forth. Graphical visualization module 218 can generate the updated graphical visualization 256 of graph 300 to include generated GUI element 258 at the vertex associated with the vertex identifier (i.e. vertex 310E).

Figure 5:
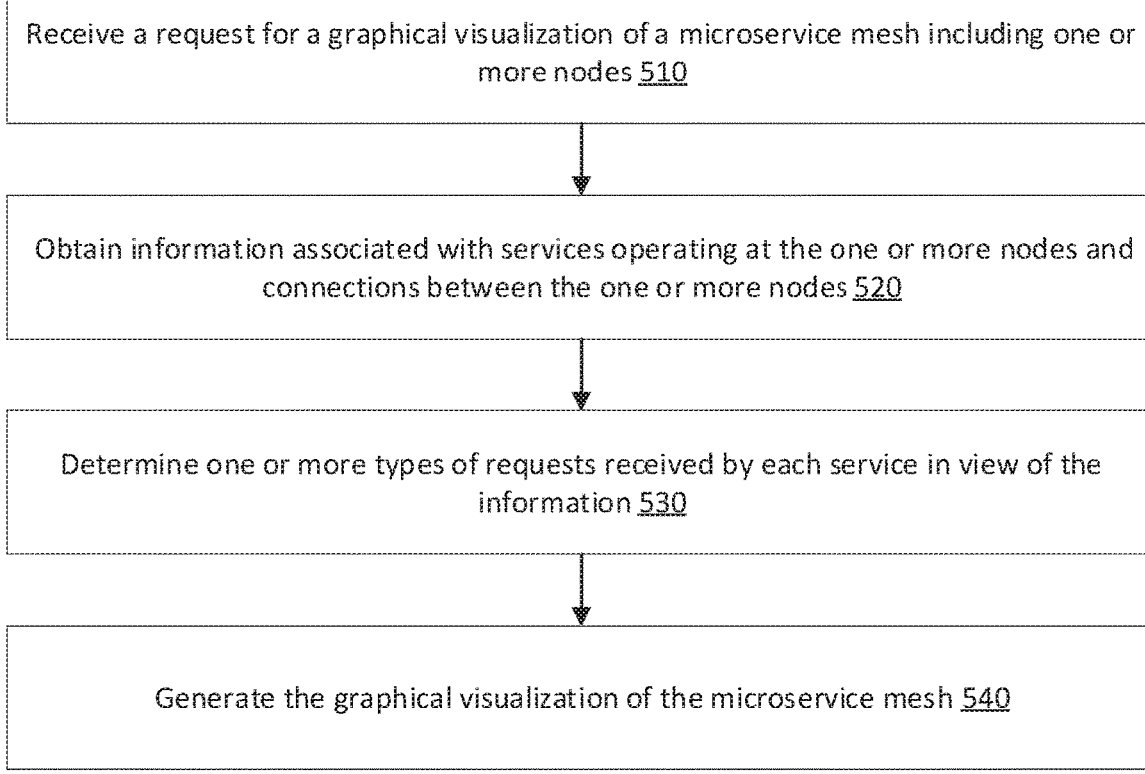
FIG. 5 is a flow diagram of a method for generating a visualization of requests traveling through a microservice mesh, in accordance with embodiments of the present disclosure.
Figure 6:
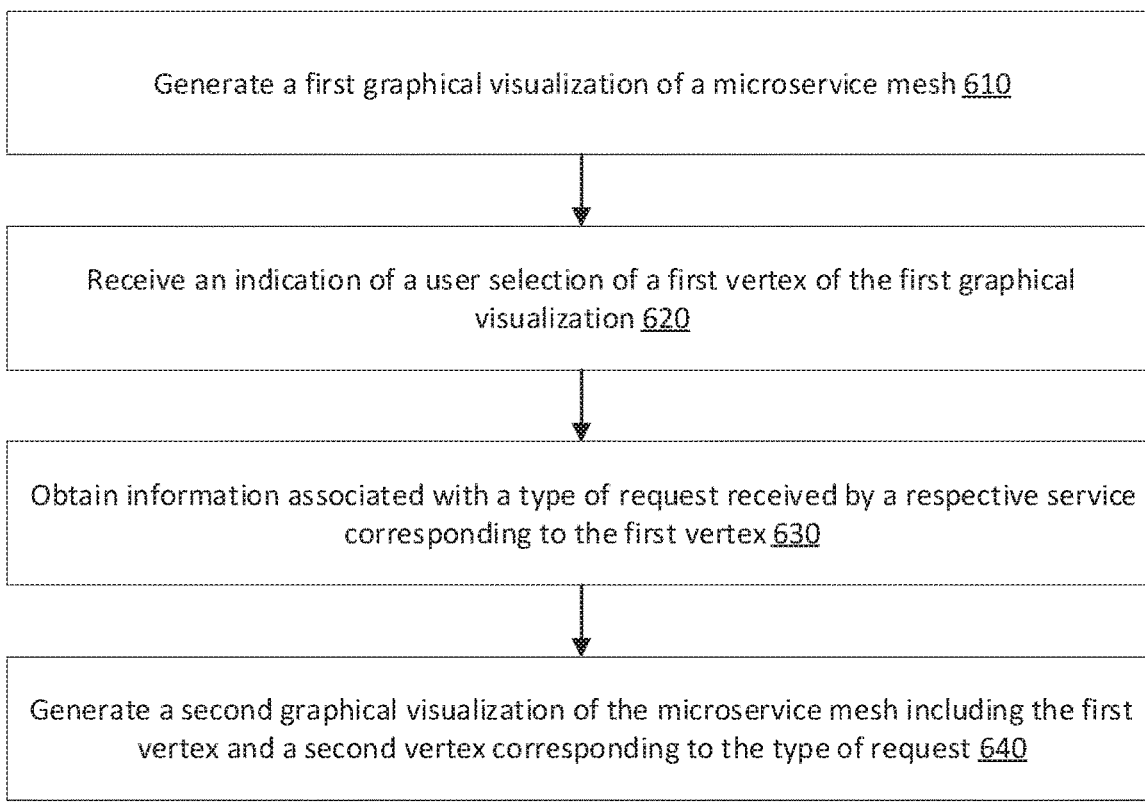
FIG. 6 is a flow diagram of another method for generating a visualization of requests traveling through a microservice mesh, in accordance with embodiments of the present disclosure.

FIGS. 5 and 6 depict flow diagrams of a methods 500 and 600 for generating a visualization of requests traveling through a microservice mesh, in accordance with embodiments of the present disclosure. Methods 500 and 600 can be performed by mesh visualization component 142, in accordance with previously described embodiments. Methods 500 and 600 can be performed by processing logic that can comprise hardware (circuitry, dedicated logic, etc.), software (e.g., software executed by a general purpose computer system or a dedicated machine), or a combination of both. Methods 500 and 600 and each of their individual functions, routines, subroutines, or operations can be performed by one or more processors of the computer device executing the method. In certain implementations, methods 500 and 600 can each be performed by a single processing thread. Alternatively, methods 500 and 600 can be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts can be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 5, method 500 begins at block 510, where processing logic receives a request for a graphical visualization of a microservice mesh including one or more nodes. At block 520, processing logic can obtain information associated with services operating at the one or more nodes and connections between the one or more nodes. At block 530, processing logic can determine one or more types of requests received by each service in view of the information. At block 540, processing logic can generate the graphical visualization of the microservice mesh. The graphical visualization can include a first vertex corresponding to a particular service and a second vertex corresponding to a type of a request received by the particular service. The graphical visualization further includes an edge corresponding to the request.

As described above, FIG. 6 is a flow diagram of another method 600 of generating a visualization of requests traveling through a microservice mesh. Method 600 begins at block 610 where processing logic generates a first graphical visualization of a microservice mesh. The first graphical visualization includes a set of vertices that each correspond to a respective service operating at one or more nodes of the microservice mesh. The visualization further includes one or more edges corresponding to requests received by each respective service.

At block 620, processing logic receives an indication of a user selection of a first vertex of the first graphical visualization. At block 630, processing logic obtains information associated with a type of request received by a respective service corresponding to the first vertex. At block 640, processing logic generates a second graphical visualization of the microservice mesh including the first vertex and a second vertex corresponding to the type of request. The second graphical visualization further includes a modified edge connecting the first vertex to the second vertex. The modified edge includes a modified form of an edge of the one or more edges that corresponds to the request.

Figure 7:
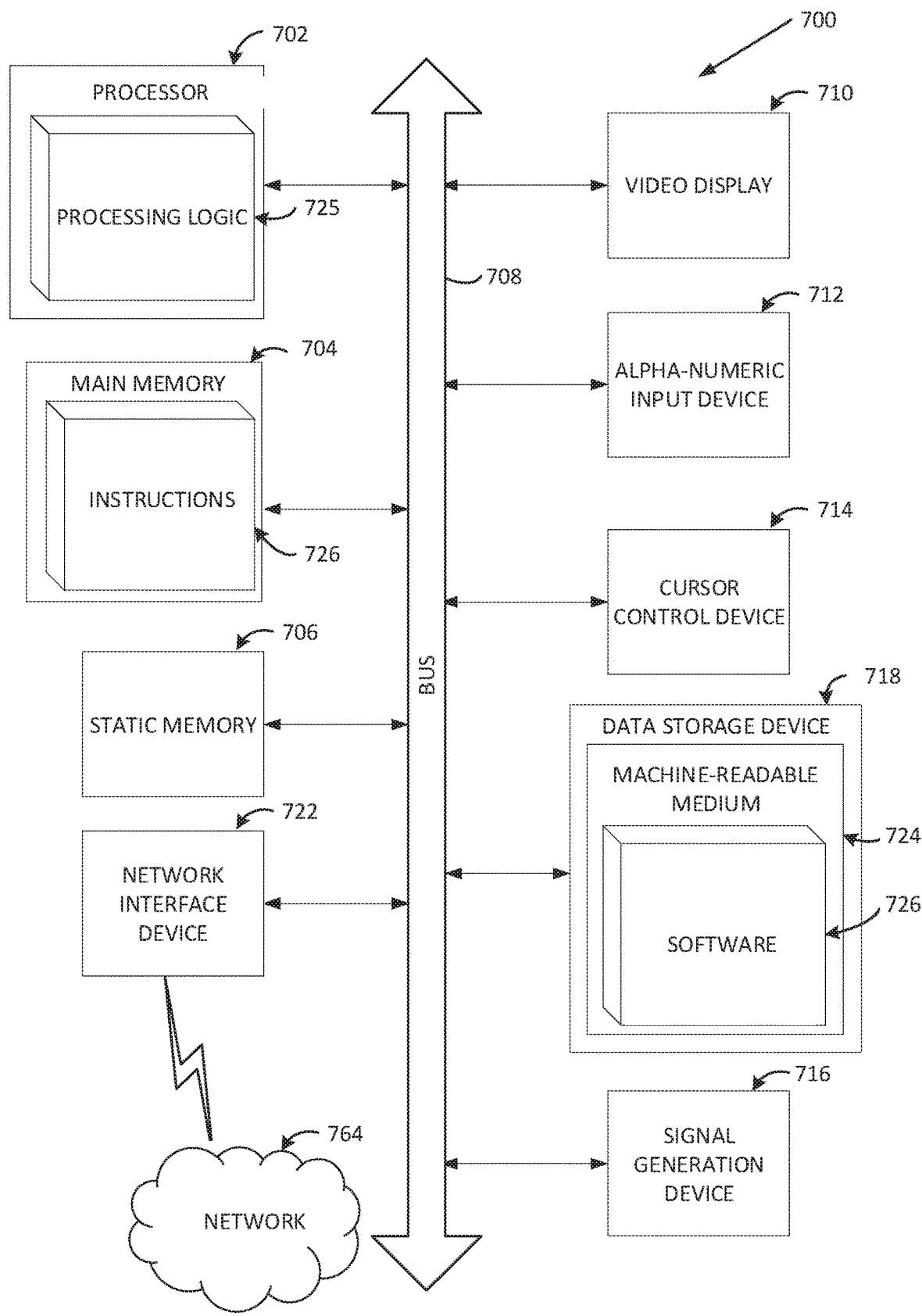
FIG. 7 is a block diagram illustrating a computing system in which implementations of the disclosure can be used.

FIG. 7 is a block diagram illustrating a computer system in which implementations of the disclosure can be used. In some implementations, the computer system 700 can support maintaining passwords for network-accessible service accounts, in accordance with previously described embodiments.

In certain implementations, computer system 700 can be connected (e.g., via a network, such as a Local Area Network (LAN), an intranet, an extranet, or the Internet) to other computer systems. Computer system 700 can operate in the capacity of a server or a client computer in a client-server environment, or as a peer computer in a peer-to-peer or distributed network environment. Computer system 700 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is to execute the instructions 726 for performing the operations and steps discussed herein.

The computer system 700 can further include a network interface device 722 communicably coupled to a network 725. The computer system 700 also can include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Instructions 726 can reside, completely or partially, within volatile memory 704 and/or within processing device 702 during execution thereof by computer system 700, hence, volatile memory 704 and processing device 702 can also constitute machine-readable storage medium 724. Data storage device 716 can include a computer-readable storage medium 724 (e.g., a non-transitory computer-readable storage medium) on which can store instructions 726 encoding any one or more of the methods or functions described herein, including instructions for implementing method 500 of FIG. 5 and method 600 of FIG. 6.

The non-transitory machine-readable storage medium 724 can also be used to store instructions 726 to support caching results of certain commands utilized for maintaining passwords for network-accessible service accounts described herein, and/or a software library containing methods that call the above applications. While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and does not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 500 and 600 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
responsive to receiving a first request for a graphical visualization of a microservice mesh comprising one or more nodes, obtaining information associated with a plurality of services operating at the one or more nodes and a plurality of connections between the one or more nodes;
determining, in view of the information, one or more types of requests received by each of the plurality of services; and
generating the graphical visualization of the microservice mesh, wherein the graphical visualization includes a first vertex corresponding to a service of the plurality of services, a second vertex corresponding to a type of a request received by the service, and an edge connecting the first vertex to the second vertex.

2. The method of claim 1, further comprising:
responsive to receiving, from a client device, a request for performance data of the microservice, obtaining the performance data; and
transmitting the performance data to the client device.

3. The method of claim 2, wherein the request for performance data comprises an indication of a user interaction, via a graphical user interface of the client device, with at least one of: the edge connecting the first vertex to the second vertex or the second vertex.

4. The method of claim 2, wherein the performance data comprises at least one of a request rate, a response time, or amount of node resource consumption.

5. The method of claim 1, wherein the first vertex is included in a first set of vertices of the graphical visualization and the second vertex is included in a second set of vertices of the graphical visualization, and wherein each of the first set of vertices corresponds to one of the plurality of services and each of the second set of vertices corresponds to a respective type of request received by a respective service.

6. The method of claim 5, further comprising:
receiving, from a client device, a request for a location of the second vertex at the graphical visualization, the request comprising a request identifier;
determining a vertex identifier associated with the request identifier, wherein the vertex identifier indicates a location of the second vertex at the graphical visualization; and
updating the graphical visualization to include an indication of the location of the second vertex at the graphical visualization in view of the vertex identifier.

7. The method of claim 1, further comprising:
determining that an error has occurred during performance of one or more operations associated with the request corresponding to the edge; and
updating the graphical visualization of the microservice mesh to include an indication of the error for at least one of: the edge or the second vertex.

8. The method of claim 1, further comprising:
determining that the service corresponding to the first vertex has received a second request of a second type; and
updating the graphical visualization of the microservice mesh to further include a third vertex corresponding to the second type of the second request and an second edge connecting the third vertex to the second vertex, the second edge corresponding to the second request.

9. A system comprising:
a memory; and
a processing device coupled to the memory, wherein the processing device to:
generate a first graphical visualization of a microservice mesh comprising one or more nodes, wherein the first graphical visualization includes a plurality of vertices each corresponding to a respective service operating at the one or more nodes, and one or more edges corresponding to requests received by each respective service;
responsive to receiving an indication of a user selection of a first vertex of the plurality of vertices, obtaining information associated with a type of request received by the respective service corresponding to the first vertex; and
generate a second graphical visualization of the microservice mesh, the second graphical visualization including the first vertex associated with the respective service, a second vertex corresponding to the type of the request received by the respective service, and an edge connecting the first vertex to the second vertex.

10. The system of claim 9, wherein the processing device is further to:
determine that the type of the request corresponding to the second vertex corresponds to an additional type of request received by an additional service operating at the one or more nodes; and
determine the second graphical visualization to include a third vertex associated with the additional service and a fourth vertex associated with the additional type of request.

11. The system of claim 9, wherein the processing device is further to:
responsive to receiving, from a client device, a request for performance data associated with the request corresponding to the edge connecting the first vertex to the second vertex, obtain the performance data; and
transmit the performance data to the client device.

12. The system of claim 11, wherein the request for performance data comprises an indication of a user interaction, via a graphical user interface of the client device, with at least one of the edge connecting the first vertex to the second vertex, or the second vertex.

13. The system of claim 9, wherein the processing device is further to:
   determine that an error has occurred during performance of one or more operations associated with the request corresponding to the edge; and
   update the second graphical visualization to include an indication of the error for at least one of the edge or the second vertex.

14. The system of claim 9, wherein the processing device is further to:
   determine that the respective service has received an additional request associated with an additional type; and
   update the second graphical visualization to further include a third vertex corresponding to the additional type of the additional request and an additional edge connecting the third vertex to the second vertex, the additional edge corresponding to the additional request.

15. A non-transitory computer readable storage medium including instructions that, when executed by a processing device, cause the processing device to:
   responsive to receiving a request for a graphical visualization of a microservice mesh comprising one or more nodes, obtain information associated with a plurality of services operating at the one or more nodes, and a plurality of connections between the one or more nodes;
   determine, in view of the information, one or more types of requests received by each of the plurality of services; and
   generate the graphical visualization of the microservice mesh, wherein the graphical visualization includes a first vertex corresponding to a service of the plurality of services, a second vertex corresponding to a type of a request received by the service, and an edge connecting the first vertex to the second vertex.

16. The non-transitory computer readable storage medium of claim 15, wherein the processing device is further to:
   responsive to receiving, from a client device, a request for performance data of the microservice, obtain the performance data; and
   transmit the performance data to the client device.

17. The non-transitory computer readable storage medium of claim 16, wherein the request for performance data comprises an indication of a user interaction, via a graphical user interface of the client device, with at least one of: the edge connecting the first vertex to the second vertex or the second vertex.

18. The non-transitory computer readable storage medium of claim 16, wherein the performance data comprises at least one of a request rate, a response time, or amount of node resource consumption.

19. The non-transitory computer readable storage medium of claim 15, wherein the first vertex is included in a first set of vertices of the graphical visualization and the second vertex is included in a second set of vertices of the graphical visualization, and wherein each of the first set of vertices corresponds to one of the plurality of services and each of the second set of vertices corresponds to a respective type of request received by a respective service.

20. The non-transitory computer readable storage medium of claim 15, wherein the processing device is further to:
   receive, from a client device, a request for a location of the second vertex at the graphical visualization, the request comprising a request identifier;
   determine a vertex identifier associated with the request identifier, wherein the vertex identifier indicates a location of the second vertex at the graphical visualization; and
   update the graphical visualization to include an indication of the location of the second vertex at the graphical visualization in view of the vertex identifier.

* * * * *